W. R. GATES.
DIE FOR TIRE TUBING MACHINES.
APPLICATION FILED JULY 25, 1916.
1,245,898.
Patented Nov. 6, 1917.
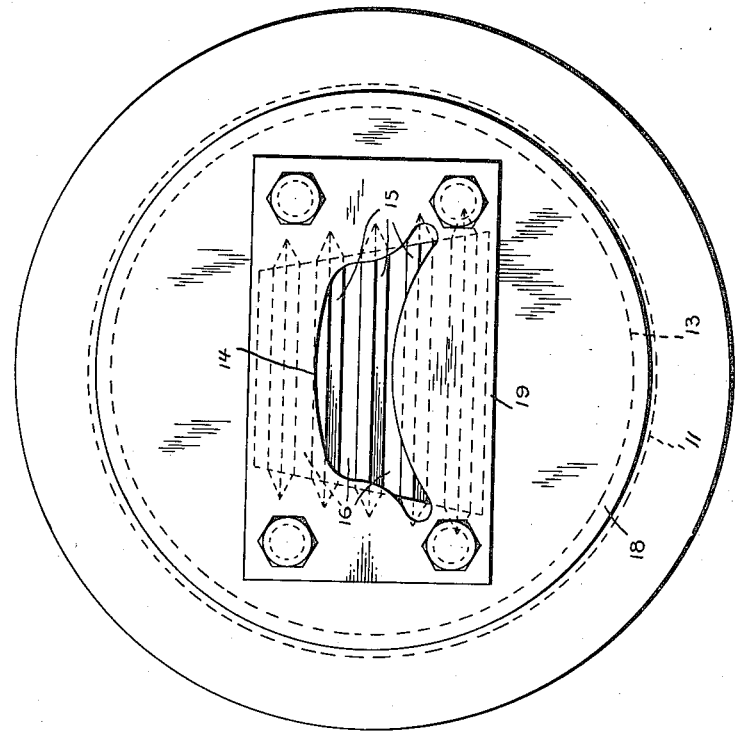
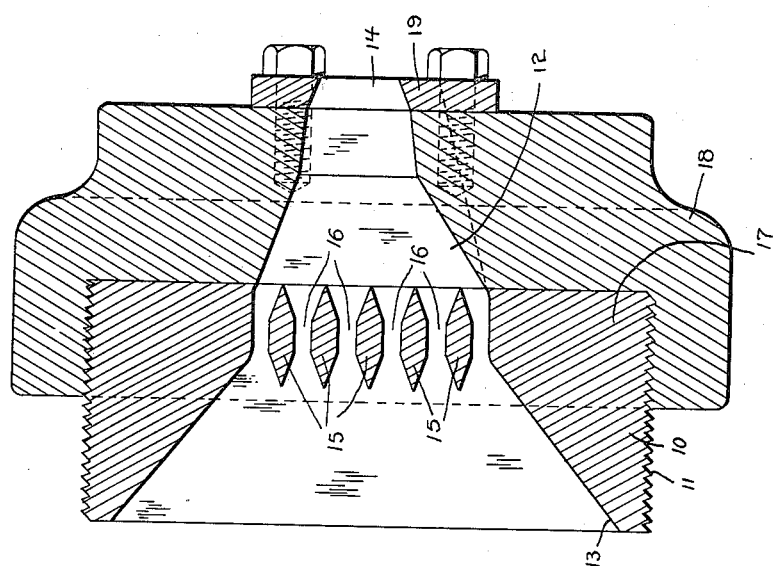
WITNESS:
S. G. Taylor
INVENTOR
William R. Gates,
BY
Ernest Hopkinson
HIS ATTORNEY

UNITED STATES PATENT OFFICE.

WILLIAM ROSS GATES, OF PROVIDENCE, RHODE ISLAND, ASSIGNOR TO REVERE RUBBER COMPANY, A CORPORATION OF RHODE ISLAND.

DIE FOR TIRE-TUBING MACHINES.

1,245,898.      Specification of Letters Patent.      Patented Nov. 6, 1917.

Application filed July 25, 1916. Serial No. 111,144.

*To all whom it may concern:*

Be it known that I, WILLIAM ROSS GATES, a citizen of the United States, residing at Providence, in the county of Providence and State of Rhode Island, have invented certain new and useful Improvements in Dies for Tire-Tubing Machines, of which the following is a full, clear, and exact description.

This invention relates to dies for solid tire tubing machines. In one method of manufacturing tires, the rubber composition is fed into a tubing machine which forces it through a die having a discharge opening adapted to impart the desired cross-sectional shape to the tire. A disadvantage existing in this method of manufacturing tires is that flaws, such as entrapped fluids, are only compressed into smaller volume by the die while their shape and location remains substantially unchanged. Whenever such imperfections extend in a direction from the tread toward the base of the tire, and especially when they are of elongated shape, they develop into radially extending cracks which soon render the tire worthless. However, imperfections which extend in a direction circumferential of the tire are less harmful, and when of small cross-section and distributed around the tire, their presence is not appreciably disadvantageous.

An object of the present invention is, therefore, to provide a die which will rearrange imperfections so that they will extend circumferentially of the tire and be reduced to a minimum cross-section radially of the tire.

The invention can be readily understood from the following description taken in connection with the accompanying drawing, in which—

Figure 1 is a longitudinal sectional view through the die.

Fig. 2 is an end elevation of the die.

Referring now to the drawing in which like characters of reference designate similar parts, 10 designates a die which is provided with screw threads 11 for attaching the same to the delivery end of a tubing machine. The die is provided with a passage-way 12, which decreases irregularly in diameter from the intake end 13 to the discharge end 14. Disposed substantially midway in the passage-way is a series of bars 15 positioned transversely, arranged parallel with each other and spaced equally apart. The material passing through the die will be separated upon encountering the leading ends of the bars, which are tapered to cleave the material, and will pass through the slots 16 formed between the bars, in substantially parallel layers. The material is reunited after leaving the bars, the rear ends of the bars being tapered as shown, to permit the various layers to gradually merge.

The material is compacted by the tapered wall of the passage-way in front of the bars so that entrapped fluids are reduced in volume. Upon encountering the bars the fluids will be liberated, and if unable to escape through the mass, will be redistributed throughout areas of small cross dimension, or thickness radially of the tire as the divided mass passes over and becomes reunited in rear of bars.

In the present embodiment I have shown the die as being formed of two members 17—18, the former being equipped with the above described bars 15, and the latter carrying the usual plate 19 in which the tire forming opening 14 is formed. However, the die may be formed in any preferred manner without departing from the spirit or sacrificing any of the advantages of the invention.

Having thus described my invention, what I claim as new and desire to protect by Letters Patent is:

1. A device for molding a rubber compound for articles having a tread or wear surface, comprising a die head having an orifice therethrough, a die plate secured to the head having an orifice registering with the orifice in the head and having one wall adapted to form the tread or wear surface of the article, and a plurality of bars disposed in the head orifice for temporarily separating the material into sheets substantially parallel with the said tread-forming wall.

2. A device for molding a rubber compound for articles having a tread or wear surface, comprising a die head having an orifice therethrough, a die plate secured to the head having an orifice registering with the orifice in the head and having one wall adapted to form the tread or wear surface of the article, and a plurality of bars disposed in the head orifice substantially parallel with the said tread-forming wall.

3. A device for molding a rubber compound for articles having a tread or wear surface, comprising a die head having an orifice therethrough, a die plate secured to the head having an orifice registering with the orifice in the head and having one wall adapted to form the tread or wear surface of the article, and a plurality of bars disposed in the head orifice providing uninterrupted spaces therebetween throughout their lengths.

Signed at Providence, R. I., this 21st day of July, 1916.

WILLIAM ROSS GATES.